US007184368B2

(12) United States Patent
Johansen et al.

(10) Patent No.: US 7,184,368 B2
(45) Date of Patent: Feb. 27, 2007

(54) OPTICAL DISPLACEMENT SENSOR ELEMENT

(75) Inventors: Ib-Rune Johansen, Oslo (NO); Olav Solgaard, Stanford, CA (US); Odd Løvhaugen, Oslo (NO); Håkon Sagberg, Oslo (NO); Henrik Rogne, Oslo (NO); Dag Wang, Oslo (NO)

(73) Assignee: Sinvent AS, Trondheim (NO)

( * ) Notice: Subject to any disclaimer, the term of this patent is extended or adjusted under 35 U.S.C. 154(b) by 170 days.

(21) Appl. No.: 10/495,224

(22) PCT Filed: Nov. 13, 2002

(86) PCT No.: PCT/NO02/00422

§ 371 (c)(1),
(2), (4) Date: Sep. 23, 2004

(87) PCT Pub. No.: WO03/043377

PCT Pub. Date: May 22, 2003

(65) Prior Publication Data

US 2005/0018541 A1 Jan. 27, 2005

(30) Foreign Application Priority Data

Nov. 13, 2001 (NO) .................................. 20015552

(51) Int. Cl.
*H04R 1/00* (2006.01)

(52) U.S. Cl. ..................................................... 367/149

(58) Field of Classification Search ................... 367/1, 367/149; 356/505; 385/13; 250/227.16
See application file for complete search history.

(56) References Cited

U.S. PATENT DOCUMENTS

| 4,496,425 | A | 1/1985 | Kuyel |
| 4,636,076 | A | 1/1987 | Pettigrew |
| 5,327,218 | A | 7/1994 | Igaki |
| 5,748,564 | A | 5/1998 | Pattanayak |
| 5,794,023 | A | 8/1998 | Hobbs et al. |
| 6,643,025 | B2 * | 11/2003 | Degertekin et al. .......... 356/505 |
| 2004/0130728 | A1 * | 7/2004 | Degertekin et al. .......... 356/505 |
| 2005/0018541 | A1 * | 1/2005 | Johansen et al. ............ 367/149 |

FOREIGN PATENT DOCUMENTS

| DE | 195 23 526 A1 | 1/1997 |
| EP | 0 688 062 A2 | 12/1995 |
| WO | WO 99/29139 A2 | 6/1999 |
| WO | WO 99/29139 A3 | 6/1999 |
| WO | WO 02/01912 A2 | 1/2002 |
| WO | WO 02/01912 A3 | 1/2002 |
| WO | WO 02/34009 A2 | 4/2002 |

* cited by examiner

*Primary Examiner*—Dan Pihulic
(74) *Attorney, Agent, or Firm*—Rothwell, Figg, Ernst & Manbeck, P.C.

(57) ABSTRACT

The invention relates an optical displacement sensor element comprising two essentially flat surfaces (1,2) being separated by a cavity defined by a spacer (5) and the surfaces (1,2), the distance between the surfaces being variable, wherein a first of said surfaces (1) is positioned on an at least partially transparent carrier (3) and being provided with a reflective pattern, the pattern constituting a pattern being shaped as a diffractive lens, and said second surface (2) being a reflective surface.

19 Claims, 13 Drawing Sheets

OPTICAL DISPLACEMENT SENSOR ELEMENT

This invention relates to an optical displacement sensor element. An example may be a pressure sensor or a microphone, comprising two essentially flat surfaces being separated by a cavity being defined by a spacer, the distance between the surfaces being variable depending on pressure fluctuation in the environment relative to the pressure in the cavity. The change in distance between the surfaces may be caused by deflection of one or both of the surfaces, or by compressing the spacer.

Until recently displacement sensors such as microphones has been based on capacitor structures and impedance measurements. This has a number of disadvantages related to sensitivity, high voltage biasing, isolation between layers, alignment and positioning of membrane relatively to back electrode, high requirements to preamplifiers, and nonlinear response, all resulting in costly and complicated solutions.

Optical microphones are able to solve many of the major problems that capacitive sensors are suffering from. There is no problems with biasing or need of electrical isolation. Interferometric sensors are able to achieve equal or better sensitivity than capacitive displacement sensors with less demanding electronics, but until now these solutions have been relatively expensive, as the problem with alignment and positioning not have been solved.

In Hall N. A. and Deterkin F. L. "Self-calibrating Micromachined Microphones with Integrated Optical Displacement Detection", Transducers '01, The 11th International Conference on Solid-State Sensors and Actuators, Munich, Germany, Jun. 10–14, 2001, these problems are discussed and an alternative solution is suggested implementing optical diffractive gratings for displacement measuring.

The method described in the article is partially based on the optical modulator described in U.S. Pat. No. 5,311,360 and provides a reliable optical solution using simple electronics for detecting displacements, as the electronic circuits only measures the change in the intensity of the reflected optical signals. The optical part is, however, still quite complicated as it demands the use of lenses for directing and focusing the light to and from the gratings, thus requiring carefully positioned optical parts for functioning properly.

U.S. Pat. No. 5,794,023 describes a different use of diffractive optics in which two phase zone plates are positioned adjacent to each other such that the second plate cancelles the effect of the first. Without outer influences the transmitted light in unaltered.

In U.S. Pat. No. 4,636,076 an optical decoder is described for measuring changes in position. A reflective grating is used in addition to a transmitting grating also having incremental shifts in position. A Moiré effect is obtained which is used to measure how many periods the reflection grating is moved relative to the transmission grating.

It is an object of this invention to improve the solution disclosed in the abovementioned article by providing an optical sensor element for measuring of displacement, pressure, acoustic signals or the like without requiring complicated optics. This is achieved by providing a displacement sensor as described above, and further being characterized as stated in the accompanying claims.

According to the invention the grating is provided with focussing capabilities so as to remove or reduce the need for complicated optics. This is explained below on the basis of Fresnel zone plates. A Fresnel zone plate is known to provide a flat lens based on diffraction.

A diffractive lens is composed by a number of zones with a step at the boundary of each zone, the boundary having a distance $r_j$ from the lens center, and j is the step number. For a transmission lens, the optical height ho of the step is often equal to the design wavelength $\lambda_0$ of the lens, thus the physical height hp may be expressed as:

$$hp = \frac{\lambda_0}{n(\lambda_0) - 1}$$

where $n(\lambda_0)$ is the refractive index at $\lambda_0$.

The general height function f(r) for a transmission diffractive lens with focal length f is:

$$f(r) = hp \cdot \left(j - \frac{r^2}{2\lambda_0 f}\right) \quad r_{j-1} \leq r < r_j$$

$$r_j^2 = 2j\lambda_0 f \quad j = 1, 2, 3, \ldots N$$

where N is the number of zones and n is the refractive index.

The phase function $\Phi(r,\lambda)$ when illuminated by a plane wave of wavelength $\lambda$, is thus defined as:

$$\Phi(r, \lambda) = \frac{2\pi}{\lambda} \cdot [n(\lambda) - 1] \cdot f(r)$$

$$= 2\pi\left(\frac{\lambda_0}{\lambda}\right) \cdot \left(\frac{n(\lambda) - 1}{n(\lambda_0) - 1}\right) \cdot \left(j - \frac{r^2}{2\lambda_0 f}\right) \quad r_{j-1} \leq r < r_j$$

This diffractive lens can not be used in broadband applications since its focal length is highly wavelength dependent, which may be expressed as $$f_m(\lambda) = \frac{\lambda_0}{m\lambda} \cdot f(\lambda_0)$$

where $f_m$ is the focal length of the diffracted order m for $\lambda \neq \lambda_0$.

If a diffractive lens is to be used in reflection the step equals half the design wavelength. In the general multi order case the corresponding equations are as follows:

$$\Phi(r, \lambda) = \frac{2\pi}{\lambda} \cdot 2 \cdot f(r) = 2\pi \cdot \left(\frac{\lambda_0}{\lambda}\right) \cdot \left(j - \frac{r^2}{2\lambda_0 f}\right) \quad r_{j-1} \leq r < r_j$$

$$r_j^2 = 2j\lambda_0 f \quad j = 1, 2, 3, \ldots N$$

and $$f_m(\lambda) = \frac{\lambda_0}{m\lambda} \cdot f(\lambda_0)$$

The active thickness of the diffractive lens in this case is thus:

$$t_p(r) = \{|\Phi(r, \lambda)|_{2\pi}\}\frac{\lambda}{4\pi}$$

neglecting the inclination of the ray path.

Figure 3A:
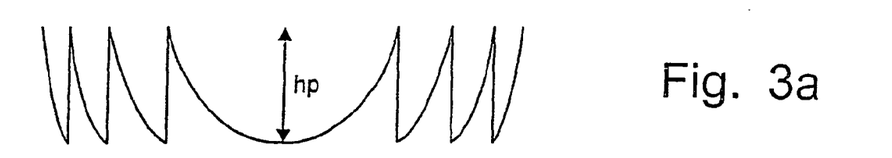
FIGS. 3*a*) illustrates a cross section of Fresnel phase zone plate.
Figure 3B:
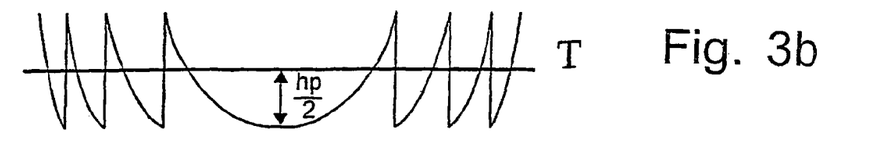
Figure 3C:
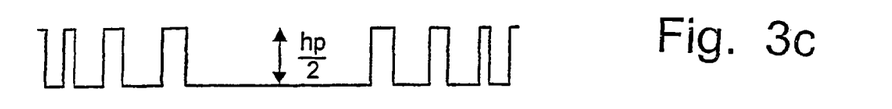
Figure 3D:
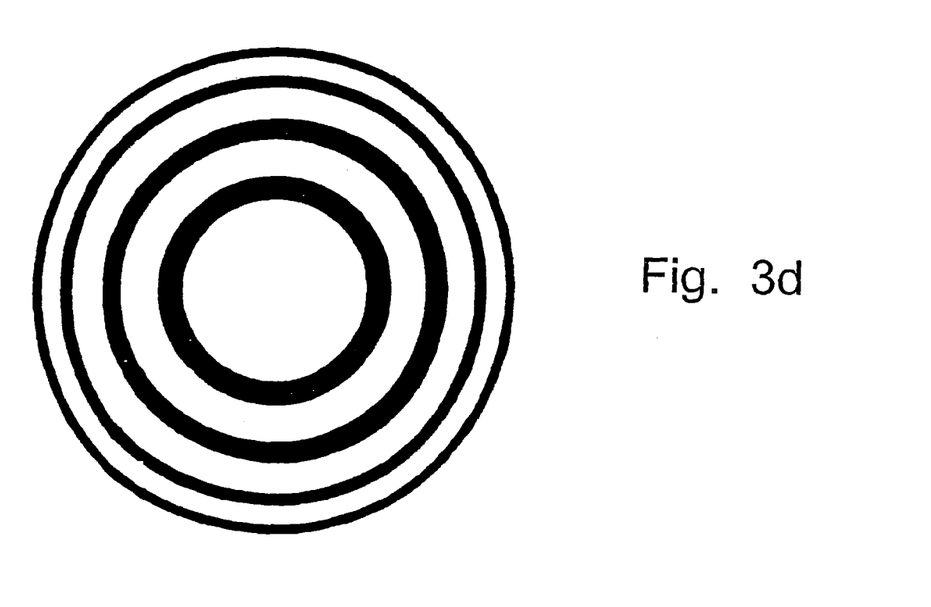
Figure 4:
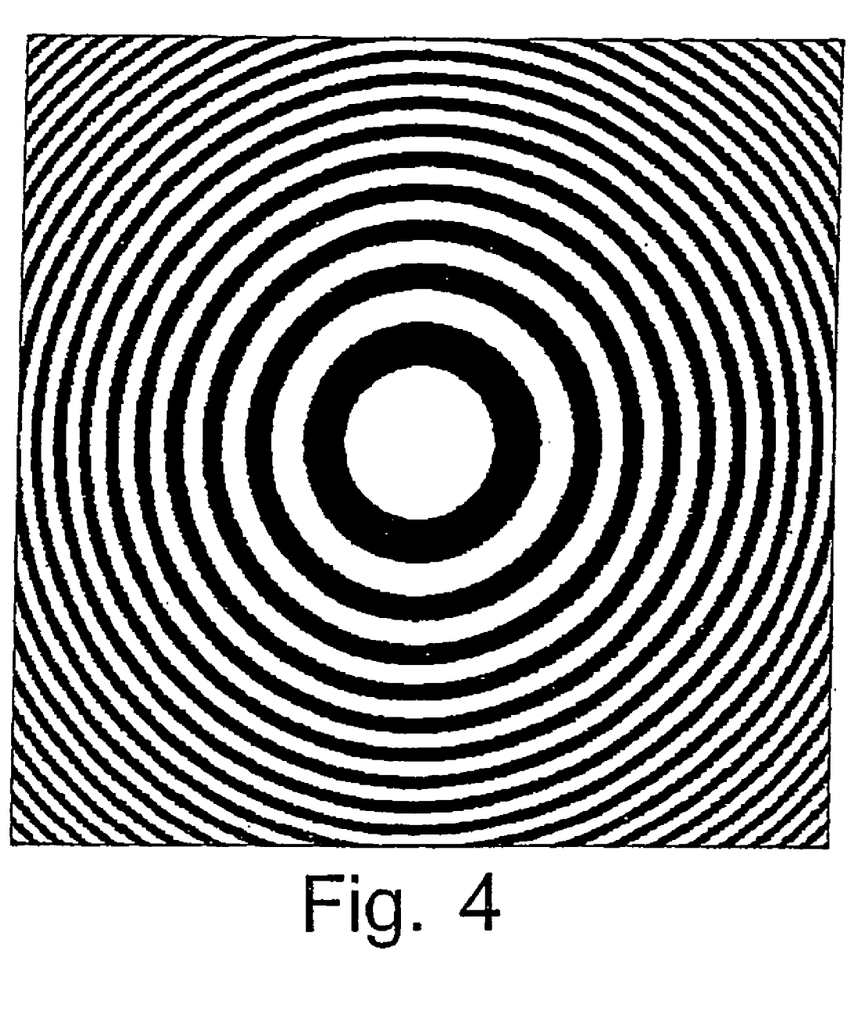
FIG. 4 shows another example of a binary phase plate

Reference is made to the accompanying FIGS. 3 and 4 for illustrating the theory explained above.

A reflective Fresnel phase zone plate has a physical height $hp=\lambda/2$ and a continues profile within each zone, as illustrated at FIG. 3A. A binary phase zone plate has only two levels, and can be obtained by thresholding the lens at half the height as illustrated in FIG. 3B. The new reflective binary phase zone plate has now a reflective top layer for all heights above the threshold, and a reflective bottom layer for all heights bellow the threshold, and the two layers are now separated by only hp/2 or $\lambda/4$, as illustrated in FIG. 3C. FIG. 3D illustrates the lens from above, where the white fields are the bottom reflective layer and the black fields are the top reflective layer. It should be noted that a binary phase zone plate has less efficiency than a Fresnel phase zone plate with continues height profile (FIG. 3A).

FIG. 4 illustrates the same as FIG. 3D, but this pattern is taken from a real design, and the aspect ratios are more realistic.

Figure 5:
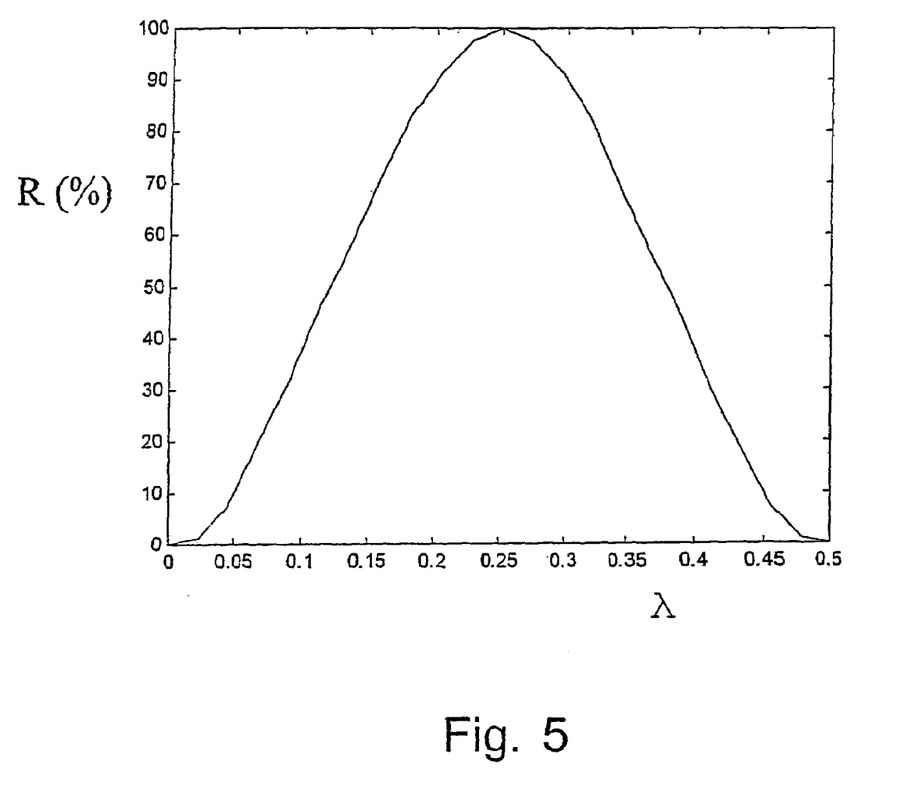
FIG. 5 illustrates intensity in the focus of the lens as a function of the distance between the upper and lower reflective surface.

The invention is based on the idea of separating the top reflective layer and the bottom reflective layer into two separate structures allowing the distance between the two layers to be changed. The change in height between the upper and bottom reflective layer will give a change in intensity as illustrated in FIG. 5. If the height is 0, the lens will work as a mirror, and if the height is ¼ of the wavelength, the maximum focus effect is obtained.

The invention will be described in more detail below, referring to the accompanying drawings illustrating the invention by way of example.

*b*) illustrates a cross section of a zone plate with a marked threshold.

*c*) illustrates a cross section of a binary phase zone plate.

*d*) illustrates a binary zone plate as seen from above

Figure 1:
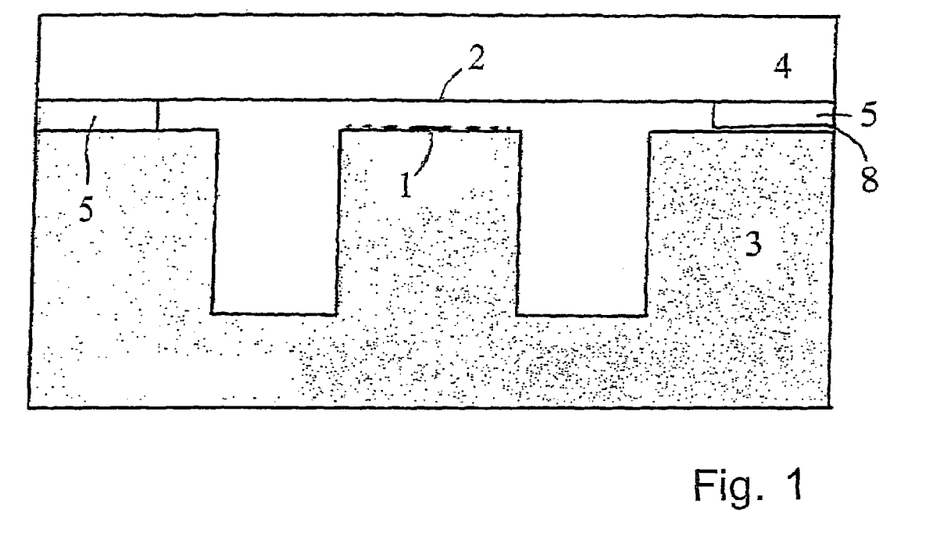
FIG. 1 illustrates the cross section of a sensor according to the invention.

The optical displacement sensor element illustrated in FIG. 1 comprising two essentially flat surfaces 1,2 separated by a chosen distance. The first surface 1 is constituted by a circular or curved optical reflecting grating providing a reflecting diffraction lens as defined above being positioned on a transparent element part 3, e.g. made from plastic or glass.

The second surface 2 is constituted by a reflecting surface being positioned on a stable element part 4 of any suitable type, e.g. glass.

In the drawings the two element parts 3,4 are separated by a spacer 5 to provide the chosen distance between the surfaces 1,2. The change in distance between the surfaces may be caused by deflection of one or both of the surfaces.

Alternatively, the spacer 5 may be of any suitable material allowing the distance between the surfaces to change with fluctuating pressures, and may alternatively be provided as a part of one of the element parts 3,4.

The sensor element according to the invention may also include a leakage channel 8 between the cavity and the environment for slow pressure equilibration between the two, as well as a physical low pass filter depending on the air throughput of the channel. The channel may be positioned in any suitable part of the sensor element, depending on the situation, the exact position being unimportant to this invention.

Figure 2:
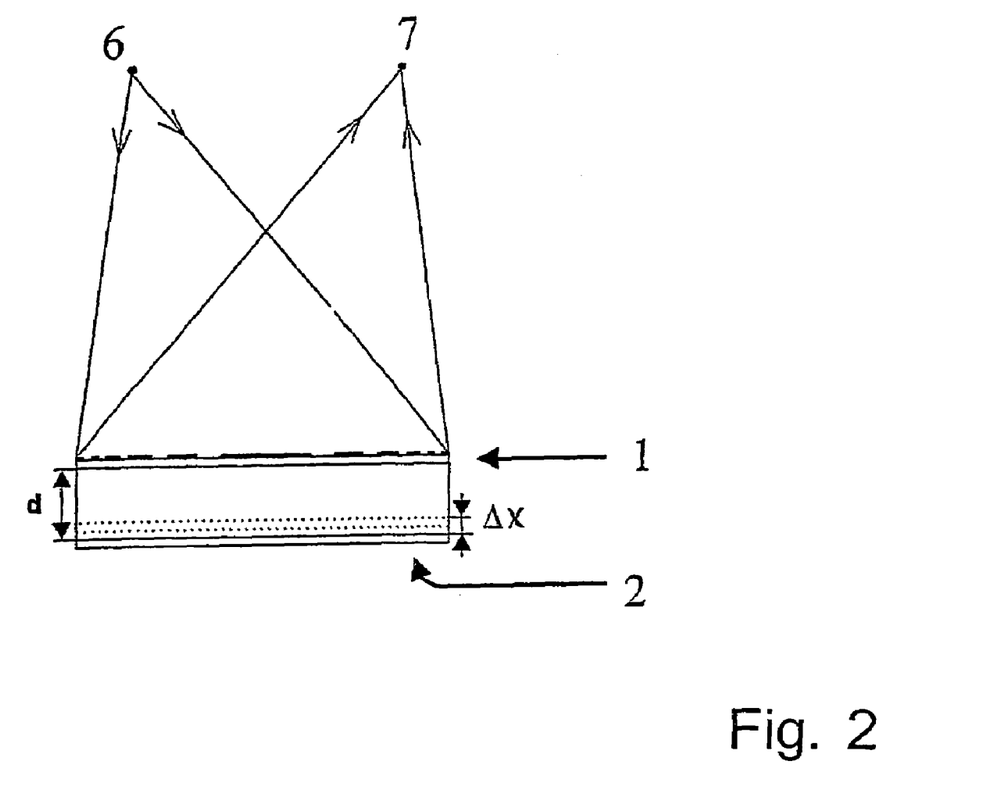
FIG. 2 illustrates the principle of the diffractive lens.

FIG. 2 illustrates the principle of the invention schematically illustrating how a light source 6 emits light towards the zone plate, said light then being reflected toward a detector 7. When the distance d between the surfaces 1,2 is changed by a distance $\Delta x$ the focussing efficiency of the lens is changed resulting in a reduction of the intensity measured at the detector 7.

FIG. 2 shows a detector and a light source being positioned in different locations. As an alternative these elements may be given the same optical position, e.g. by the use of a beam splitter. This requires a slightly more complicated system, but also allows for a source/detector unit, which is some cases, may be more convenient. A more compact system may comprise a single optical fiber terminated at the optical axis at twice the focal length of the lens, the source and detector being positioned at the other end of said optical fiber, being separated by an optical coupler.

If a collimated or partly collimated source is used (i.e. a diode laser or a LED), the tunable binary lens may be used to focus the light onto the detector.

Also, improved accuracy may be achieved by using at least two detectors, or possibly a detector array, positioned in the focus or along the line of focus points of the additional reflection orders of the diffractive lens.

The sensor according to the invention has a membrane that is sensitive to pressure variations. A small change of pressure results in a displacement $\Delta x$ of the membrane. A mask (sticked to a glass substrate) is located above the membrane. The combination of the reflective membrane and the mask works like a Fresnel zone plate. This binary lens is such as it conjugates the source on to the detector as shown in FIG. 2.

As mentioned above, for a distance mask to membrane d such as d is a odd multiple of $\lambda/4$, the focus is on the detector. For a distance mask to membrane d such as d is a multiplier of $\lambda/2$, the phase delay becomes $2\pi$ and the system acts like a mirror (or in other words does not focus).

By measuring the energy at the detector, it is possible to deduce how well it focuses and the $\Delta x$ displacement of the membrane.

When this tuneable lens is used as a displacement sensor, the distance from the reflecting part of the reflective pattern to the reflective membrane should be an odd multiple of $\lambda/8$.

Physical dimensions of a sensor used as microphone, based on the embodiment shown in FIGS. 1 and 2 may be as follows:

The diameter of the patterned surface may be around 2–3 mm, the thickness of the spacer from 0.1 to 8 micrometers depending of which acoustic frequency range to cover. The diameter of the membrane may be around 5 mm. The distance from the surfaces to the detector and source may be around 5 to 10 mm. If the detector and source is too close, the zones become to close to each other, and shadowing effects starts to dominate. Shadowing effects are also a problem if the spacer becomes too thick.

As illustrated in FIG. 4 the preferred embodiment comprises a circular fringe pattern in the diffractive lens. It is, however, possible to use other solutions, the most closely related being circle sections, e.g. by only using the rightmost third of the fringe pattern in FIG. 4. The focussing characteristics of this lens will be essentially the same as with a circular pattern, but since the focussed light will arrive at the optical axis from one direction a detector array may be positioned along the optical axis. In this case the detector receiving the maximum light intensity may indicate the location of the focus. Also, this embodiment may provide means for measuring the location of several reflection modes of the grating, providing an unambiguous measure of the distance between the surfaces.

Other curves relating to more general conical sections may in some cases also be used, as well as two dimensional detector matrixes positioned in or close to the optical axis.

FIG. 5 illustrates the relative intensity R at the focus of the reflecting diffractive lens as a function of the distances between the surfaces 1,2 measured relative to the wavelength $\lambda$. As is clear from the figure the sensitivity is at its maximum at when the relative intensity is approximately 50%, at the distance of $\frac{1}{8}\lambda$ and $\frac{3}{8}\lambda$. By maintaining a distances close to one of these ranges the sensitivity is maximised. However, the sensitivity decreases at larger inputs as the distance approaches $\frac{1}{4}\lambda$. The sensor element therefore preferably should be dimensioned to keep the operating range in the range of $\lambda/8+m\lambda/4+n\lambda$, where n,m=0, 1,2,3, . . . , as is illustrated in FIG. 6.

Figure 6:
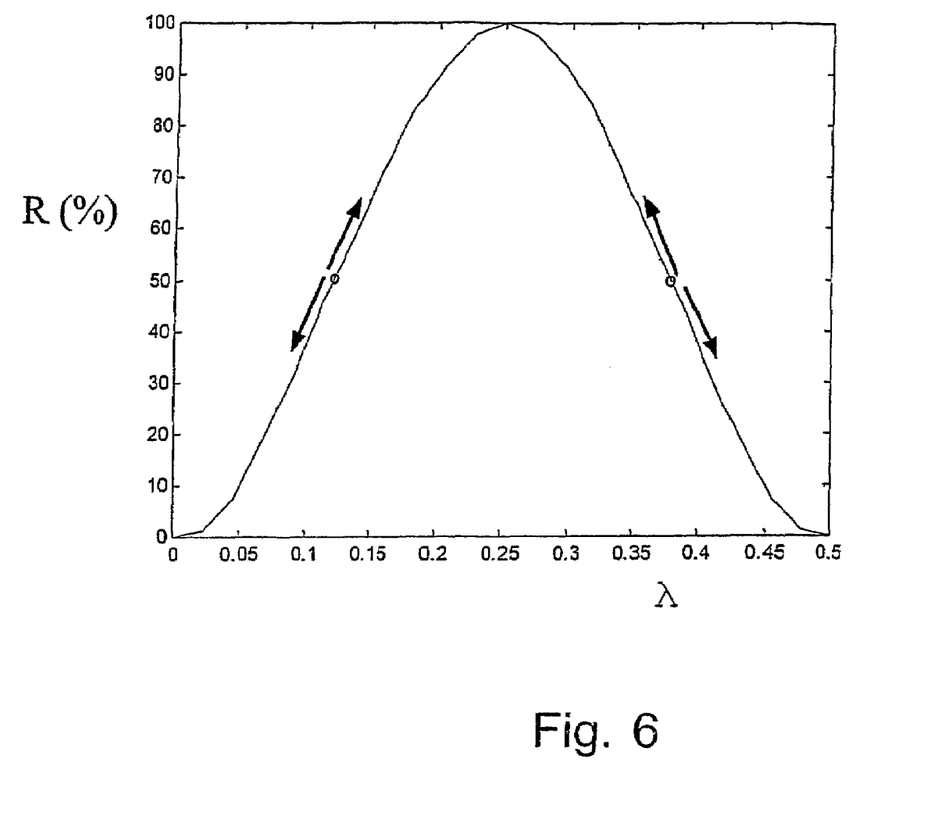
FIG. 6 as FIG. 5, but indicated the most sensitive part when used as a sensor.

FIG. 6 illustrates the maximum sensitivity points along the curve in FIG. 5. It should be noted that the illustrated examples here show an ideal situation in which the refractive indexes and thus reflection coefficients are not taken into account. The operating points may thus be positioned differently depending on these factors, the exact positions of the operating points being possible to calculate by calculating the positions corresponding to the second derivative variation of the reflected signal R being zero.

The curve is periodical with $\frac{1}{2}\lambda$ periods. To avoid the so called "squeeze film effect" at small distances between surfaces, because of air being squeezed in and out of the space between the surfaces, larger distances than illustrated in drawings may be preferred. The squeeze film effect may, however, be used as a damping effect avoiding resonance in the system, thus providing a parameter to be considered when making the sensor element.

Figure 7:
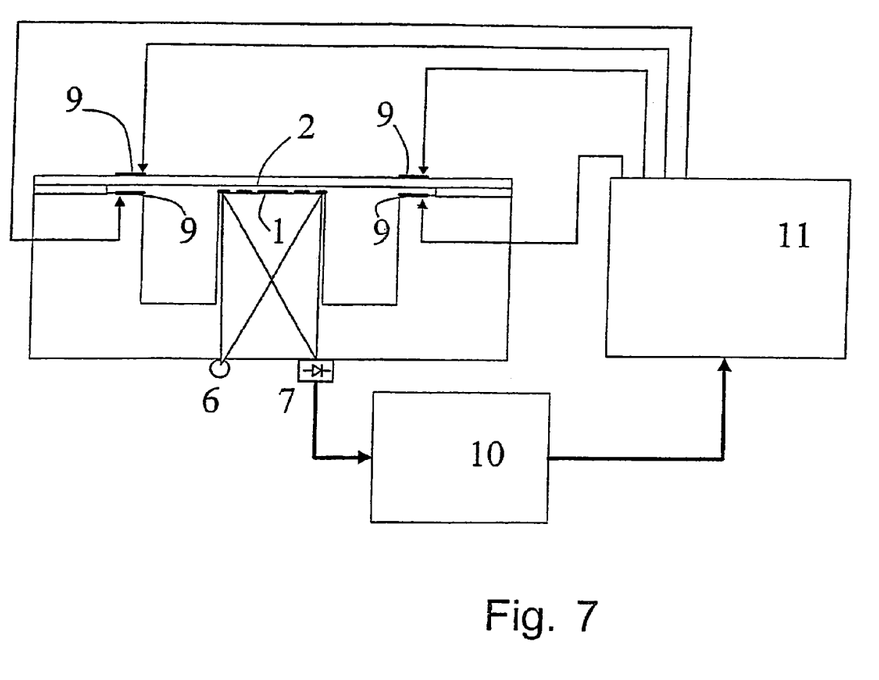
FIG. 7 illustrates an embodiment of the invention with controlled zone plate height.

The reflecting gratings and surfaces 1,2 may be dielectric or metallic depending on use and wavelength characteristics. According to one embodiment of the invention illustrated in FIG. 7 the surfaces are metallic and are connected to an electric power supply so as to provide a voltage between the two surfaces. FIG. 7 illustrates an embodiment in which the reflecting surfaces are not used for this purpose but in which additional metallic layers 9 are provided in a number of positions for obtaining parallel surfaces.

In the embodiment illustrated in FIG. 7 the detector is coupled to an amplifier 10, providing a signal to a control unit 11. The control unit 11 provides a voltage to the metallic layers 9 for controlling the distance between the surfaces 1,2.

By adjusting the voltage the distance between the surfaces may be adjusted and optimal focussing characteristics may be obtained at all times. The voltage required to obtain the chosen distance is indicative of the pressure provided on the sensor element, thus providing a method for obtaining a readout signal from the detector. The electrical circuitry for obtaining this is well known and the exact nature of this not important to this invention. Thus it will not be described in any detail here.

An electrostatic field may be applied to tune the distance between the diffractive pattern and the reflective membrane to optimise the sensors sensitivity according, or to lock the displacement to a given position (like a tunnelling tip sensor), which will increase the dynamic range of the sensor.

The diffractive pattern could off course be on a membrane, or the diffractive pattern could be made of a thin layer where the transmitting parts has been etched away, allow the air to run trough the diffractive pattern.

Figure 8:
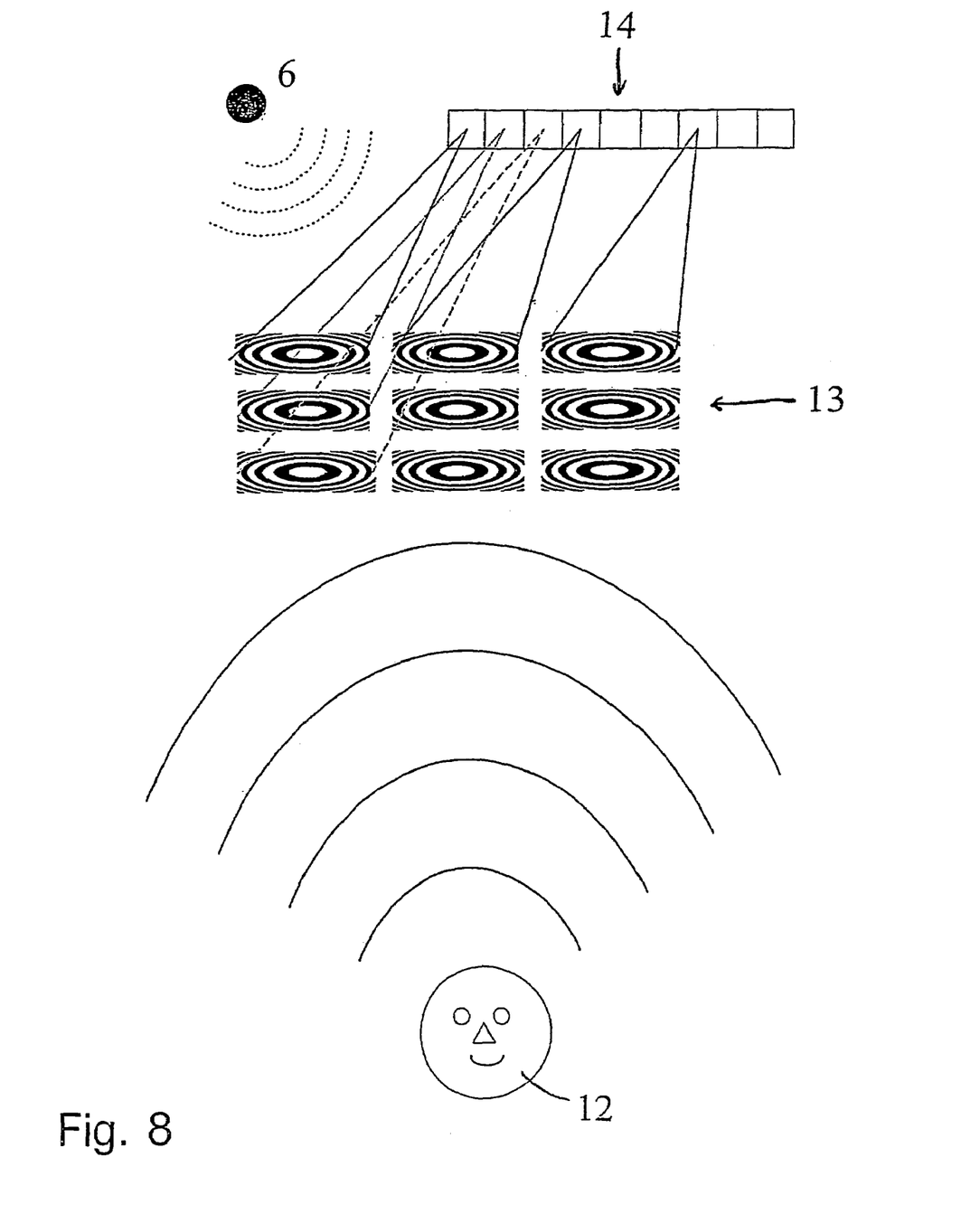
FIG. 8 illustrates a system using a number of displacement sensors according to the invention for acoustic measurements.

FIG. 8 illustrates an application of the invention in which a laser/LED 6 is used to illuminate a 2-D array of diffractive microphones 13, and each of the diffractive patterns are designed to focus at a predetermined part of a 1-D or 2-D optical detector array 14.

For example the diffractive microphones can be designed in such a way that an array light detector, i.e. a CCD camera, can detect them all. It is then possible to make an acoustic sensor which is able to measure the phase of the acoustic signal, and thereby by per se known electronical calculating means or software, reconstruct the phase of an acoustic signal from a point/direction 12 in the room. Thus it is possible to make an acoustic detector, which is able to focus and pick up the sound from i.e. a person 12 and suppress the noise from the rest of the room.

Figure 9:
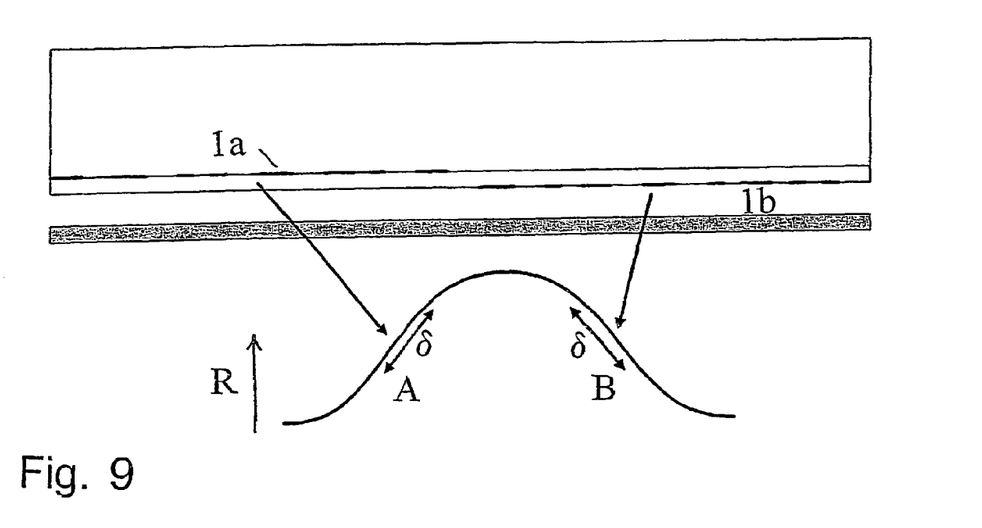
FIG. 9 illustrates a differential diffractive sensor according to the invention.
Figure 10:
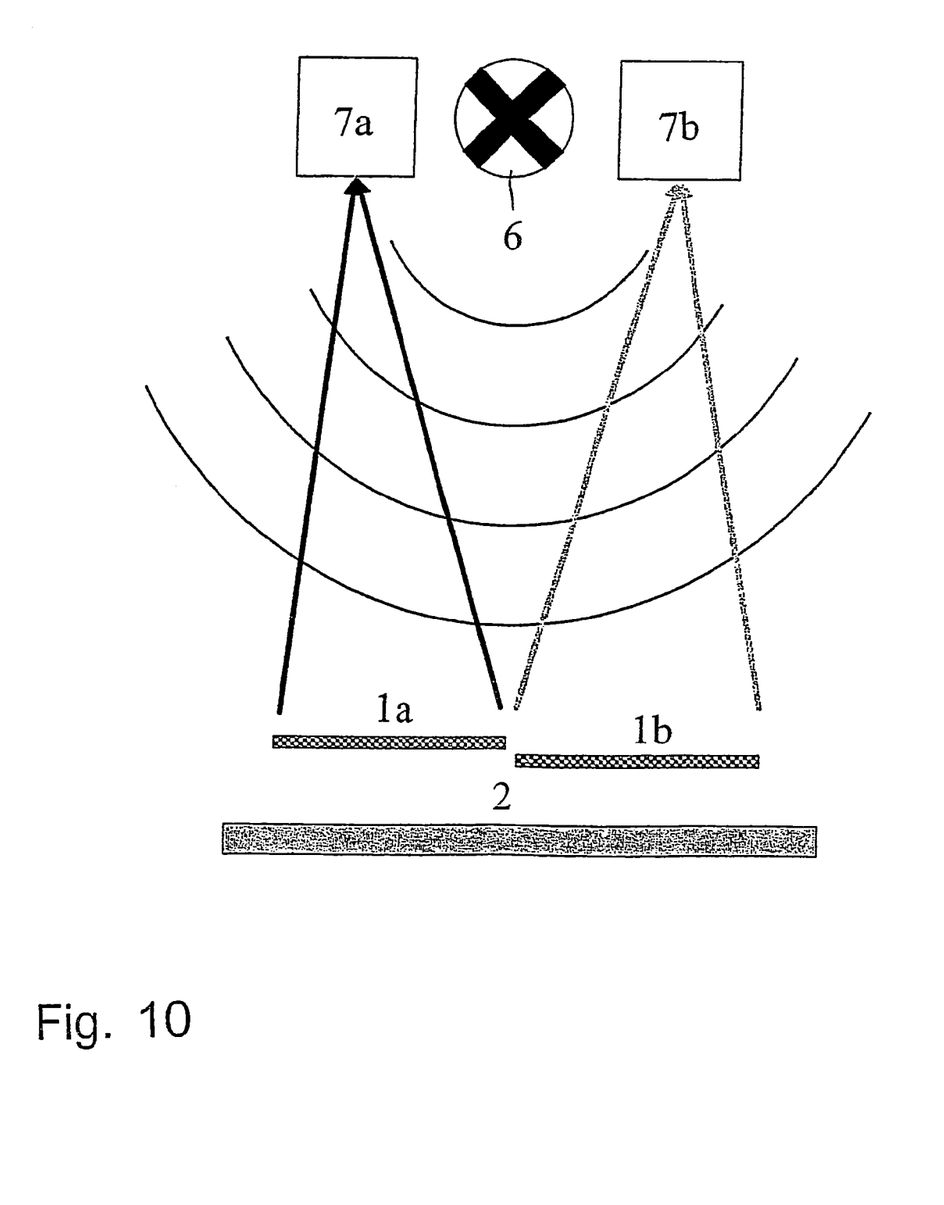
FIG. 10 The signals from the two different height levels shown in FIG. 9 are focused on two different detectors.

FIG. 9 illustrates a differential diffractive sensor according to the invention being provided with two focusing patterns 1a, 1b in two different heights relatively to the reflecting bottom membrane. The two different heights can easily be produced by first making one pattern on the glass substrate, then sputter or evaporate a thin layer of glass, and then put on the second pattern. In FIG. 10 the signals from the two different height levels shown in FIG. 9 are focused on two different detectors 7a,7b.

The main advantage with a differential sensor is that it is possible to compensate for source drift, and get accurate readings. As illustrated in FIG. 9 the difference in distance between the first reflecting patterns 1a,1b is adapted to provide measurements from different parts of the curve discussed with reference to FIGS. 5 and 6. Thus the signals A,B measured at the detectors 7a,7b may provide a differential signal:

$$A=I(1-\delta), B=I(1+\delta), \delta<<1$$

$$\Delta=(A-B)/(A+B)\approx 2\delta,$$

where the contributions from the source is close to eliminated, and where A is the detected signal from the first lens while B is the detected signal from the second grating. I is the intensity received from the source, $\delta$ is the shift in the reflected intensity R of the reflected light as a result of a relative movement between the surfaces and $\Delta$ is the differential signal between the detectors.

Figure 11:
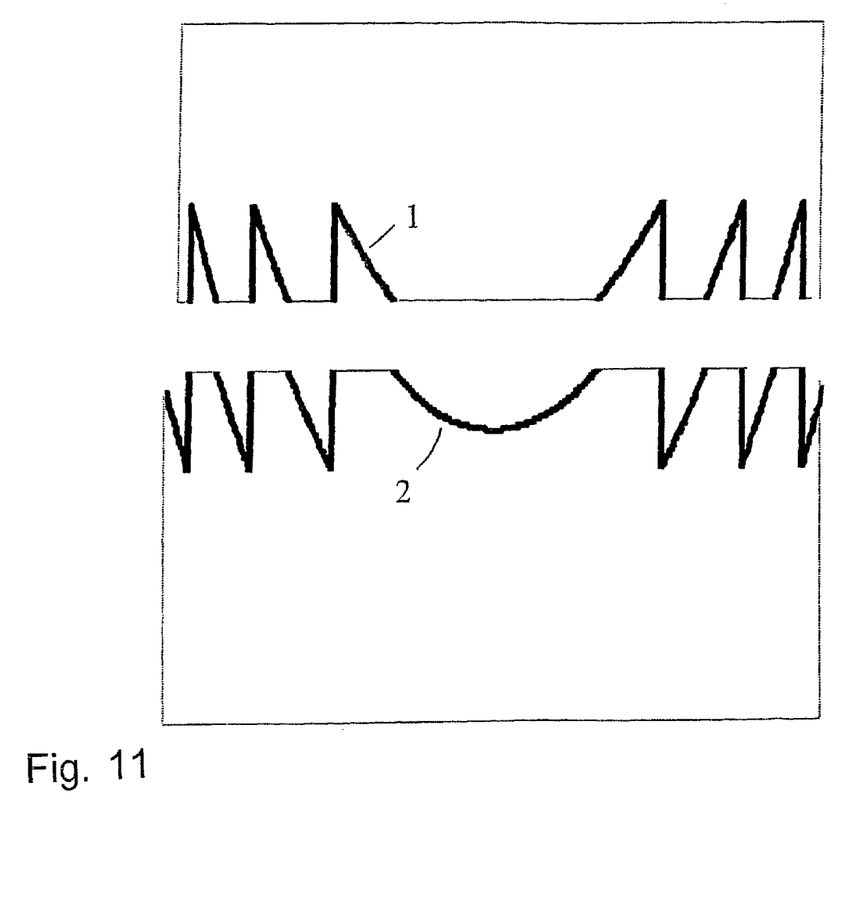
FIG. 11 illustrates a 3-D diffractive phase lens working in reflection.

FIG. 11 illustrates a 3-D diffractive phase lens working in reflection. If the lens is split in a top and a bottom part, a tunable lens may be made, which can work as sensor similar to the binary focusing sensor. The lens will be on when the top and bottom layer are separated with (m×λ/2), m=0,1,2, 3 . . . , and off when the layer are separated by (m×λ/2)±λ/4, m=0,1,2,3 . . . . In between on and off, the construction can be used as a sensor.

Figure 12:
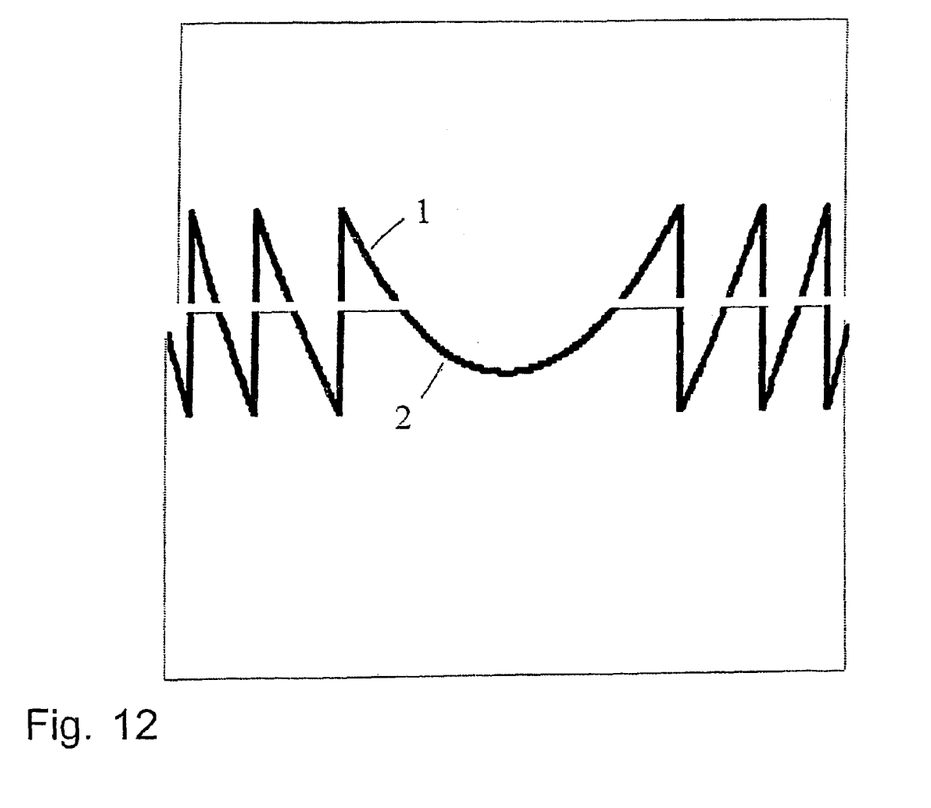
FIG. 12 illustrates the phase lens shown in FIG. 11 when the two parts of the reflecting lens are summing the light in phase.

FIG. 12 illustrates the phase lens shown in FIG. 11 when the two parts of the reflecting lens are summing the light in phase, thus setting the lens in an operative mode.

Figure 13:
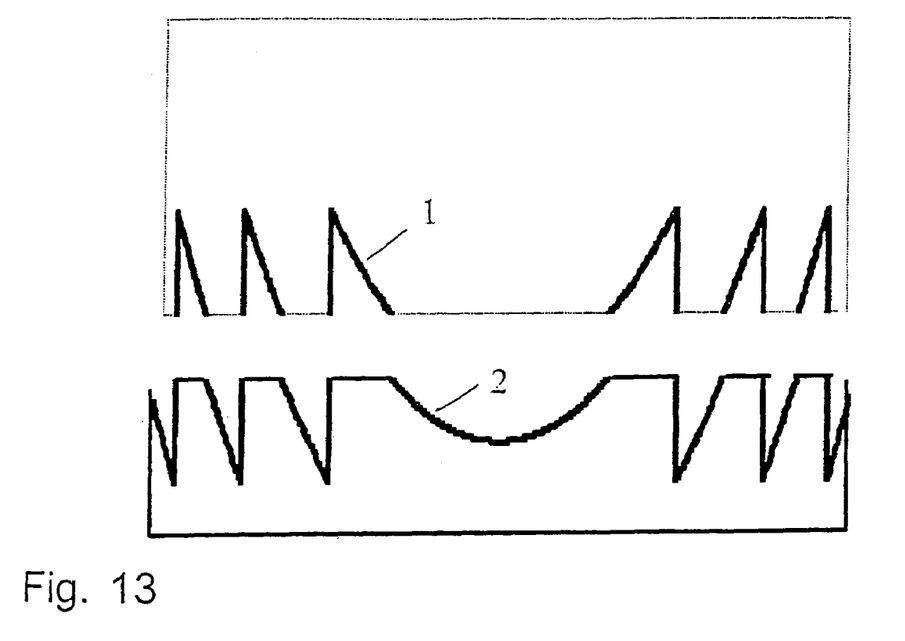
FIG. 13 illustrates the production of a lens as shown in FIGS. 11 and 12.

FIG. 13 illustrates the production of a lens as shown in FIGS. 11 and 12. Production of the sensor lens can be done by first make a mold shape and then replicate the bottom part of the 3-D pattern into i.e. the membrane, and then coat it with metal, or just electroplate the membrane directly in the mold with nickel. The metal in "shadow" regions will not affect the performance. The top part can be made by first making a mold shape and then replicate the 3-D pattern in a transparent material, i.e. by molding in plastic or by UV replication techniques. When the top part of the 3-D pattern is ready, this must also be coated with metal. As we only want metal in the pits in the 3-D top part, the metal at the planar surface must be removed, i.e. by polishing.

The invention has been described here primarily as related to microphones or pressure sensors. It may, however, possibly with minor adaptions, also be use in other situations such as accelerometers or similar, in which one surface moves relative to the other. In the case of the accelerometer the moving surface may e.g. be provided with a weight so as to increase the sensitivity.

The invention claimed is:

1. Optical displacement sensor element comprising at least two essentially parallel surfaces (1,2) being separated by a cavity defined by a spacer (5) and the surfaces (1,2), the distance between the surfaces being variable, wherein a first of said surfaces (1) is positioned on an at least partially transparent carrier (3) and being provided with a reflective pattern, the pattern constituting a pattern being shaped as a diffractive lens having a pedetermined focal length, and said second surface (2) being a reflective surface.

2. Optical element according to claim 1, wherein the pattern is a circular pattern.

3. Optical element according to claim 1, wherein the distance between the surfaces is close to λ/8+nλ/4+, n, m=0, 1, 2, 3, . . . and λ being the optical wavelength.

4. Optical element according to claim 1, wherein the reflective surfaces of the element are metallic surfaces.

5. Optical element according to claim 1, wherein the element includes a leakage channel between the cavity and the environment for slow pressure equilibration between the two.

6. Optical element comprising an optical element according to claim 1, also comprising a light source directed toward the diffractive lens and at least one detector being provided in a chosen position to measure reflections from the diffractive lens.

7. Optical element according to claim 6, comprising a detector array measuring the positions of at least one reflection order of the diffractive lens.

8. Optical element according to claim 7, wherein the detector array has an at least partially axial orientation.

9. Optical element according to claim 6, wherein each surface is provided with an electrical conductor, the conductors being coupled to an electrical control unit for applying a voltage on the conductors, the power supply also being coupled to said at least one detector so as to control the distance between surfaces when a change is detected, the output voltage also being indicative of the changes in the pressure of the environment.

10. Optical element according to claim 9, wherein the control unit is adapted to adjust the working distance between the surface to a chosen value.

11. Optical element according to claim 1, comprising a channel for controlled air throughout between the space between the surfaces and the environment.

12. Optical element according to claim 1, wherein the first and second surfaces defining a ringshaped structure defining a reflective phase lens, said pattern in said first surface defining a first part of said lens in a direction perpendicular to the surfaces and said second part defining a second part of said lens.

13. Optical system for measuring acoustic signals comprising at least two elements according to claim 1, in which the optical elements are positioned in a 1 or 2 dimensional array, the system also comprising a 1 or 2 dimensional dectector array for detecting fluctuations in the received light corresponding to the received acoustic signal, said detector array being coupled to calculating means for measuring the phase of the received acoustic signal at each optical element.

14. Optical system according to claim 13, wherein said calculating means also comprises means for calculating the position of the acoustic source.

15. Optical system according to claim 14, wherein said calculating means comprises filtering means for attenuating acoustic signals on the basis of their positions or directions, as provided by the calculated phase.

16. A method of constructing an optical displacement sensor element comprising:
providing two generally parallel surfaces separated by a variable distance;
positioning a first of said surfaces on a carrier that is at least partially transparent; and
providing a reflective pattern on said carrier, the reflective pattern having the shape of a diffractive lens having a predetermined focal length.

17. The method of claim 16, wherein the optical displacement element is employed as a pressure sensor.

18. The method of claim 16, wherein the optical displacement element is employed as a microphone.

19. A method of constructing an optical displacement sensor element comprising:
providing a plurality of pairs of generally parallel surfaces separated by a variable distance;
positioning a first of said surfaces of each pair on a carrier that is at least partially transparent; and
for each pair, providing a reflective pattern on said carrier, the reflective pattern having the shape of a diffractive lens having a predetermined focal length.

* * * * *